Figure 1:
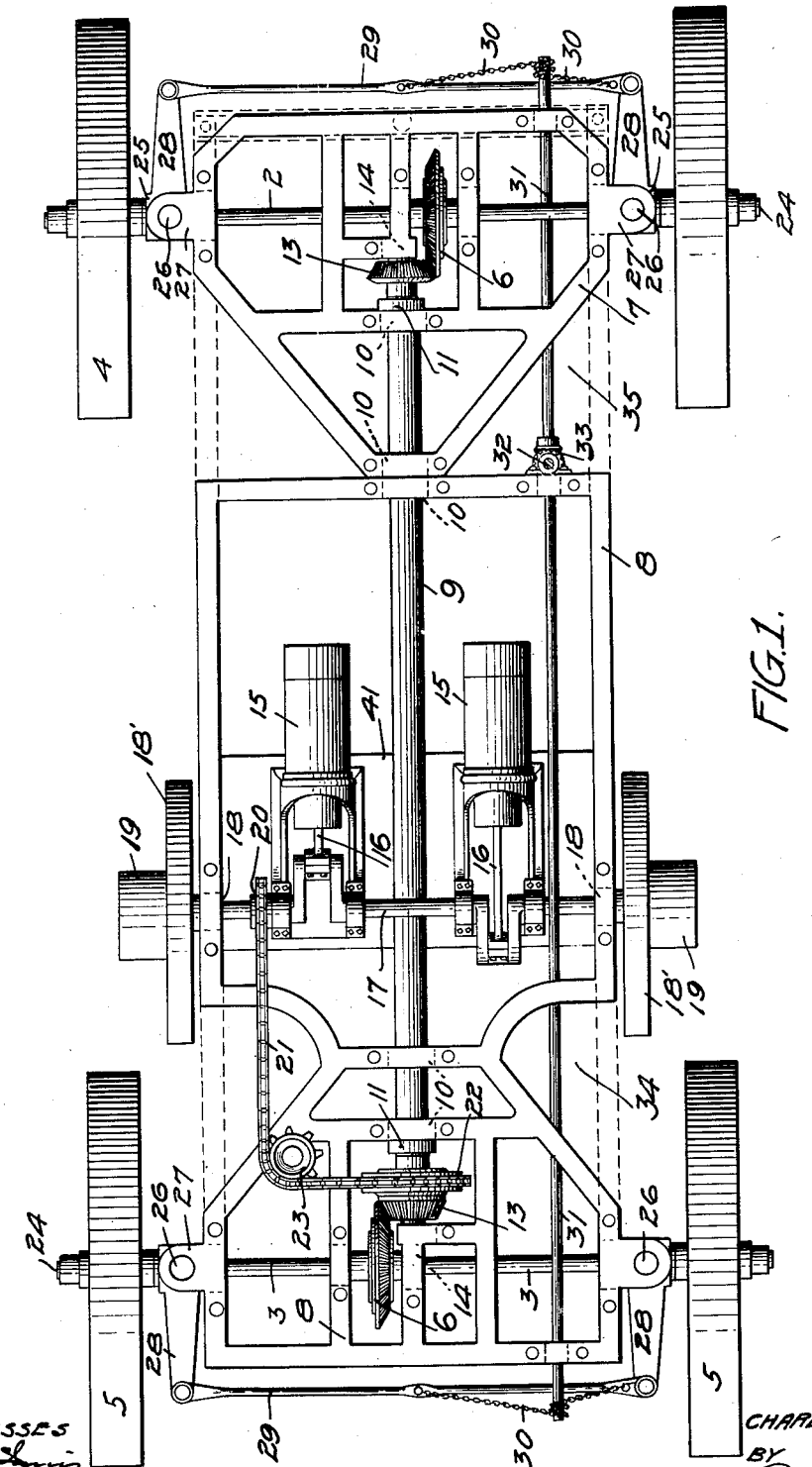

C. O. WYMAN.
RUNNING GEAR.
APPLICATION FILED JAN. 22, 1906.

938,196.

Patented Oct. 26, 1909.
3 SHEETS—SHEET 1.

INVENTOR
CHARLES O. WYMAN
BY
Paul & Paul
HIS ATTORNEYS

WITNESSES

C. O. WYMAN.
RUNNING GEAR.
APPLICATION FILED JAN. 22, 1906.
938,196.
Patented Oct. 26, 1909.
3 SHEETS—SHEET 2.
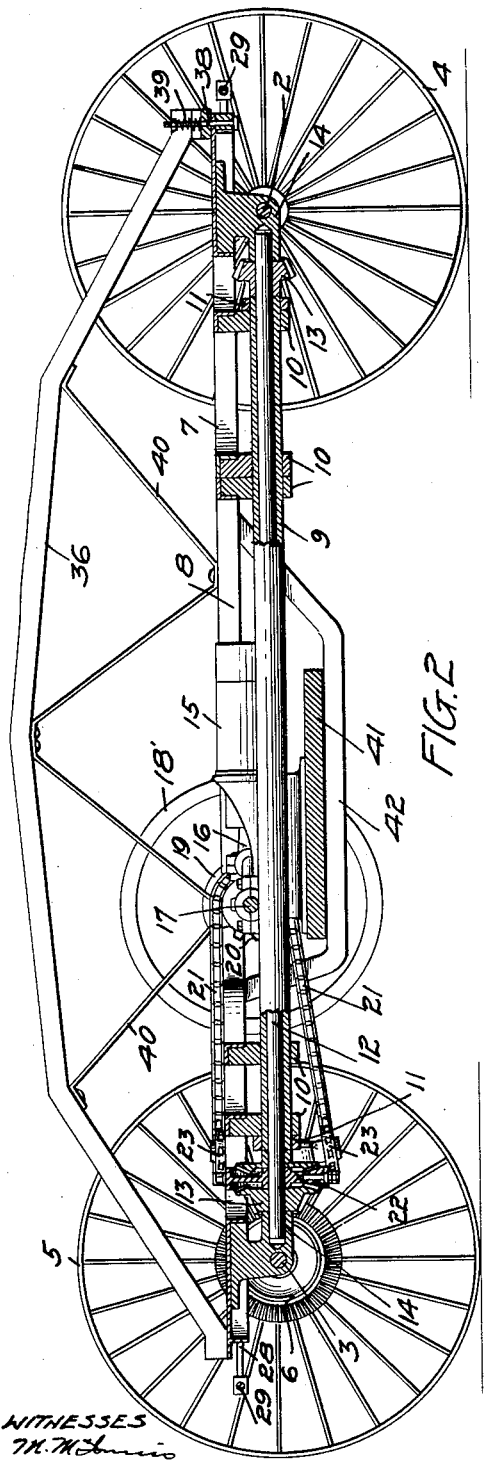
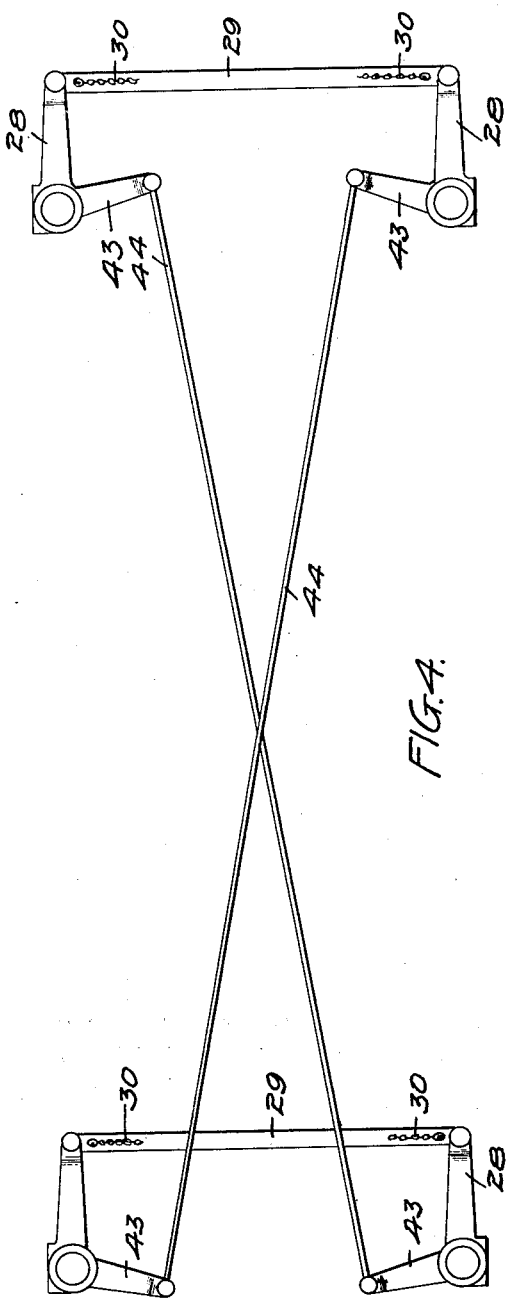
INVENTOR
CHARLES O. WYMAN
BY
Paul & Paul
HIS ATTORNEYS C. O. WYMAN.
RUNNING GEAR.
APPLICATION FILED JAN. 22, 1906.
938,196.
Patented Oct. 26, 1909.
3 SHEETS—SHEET 3.
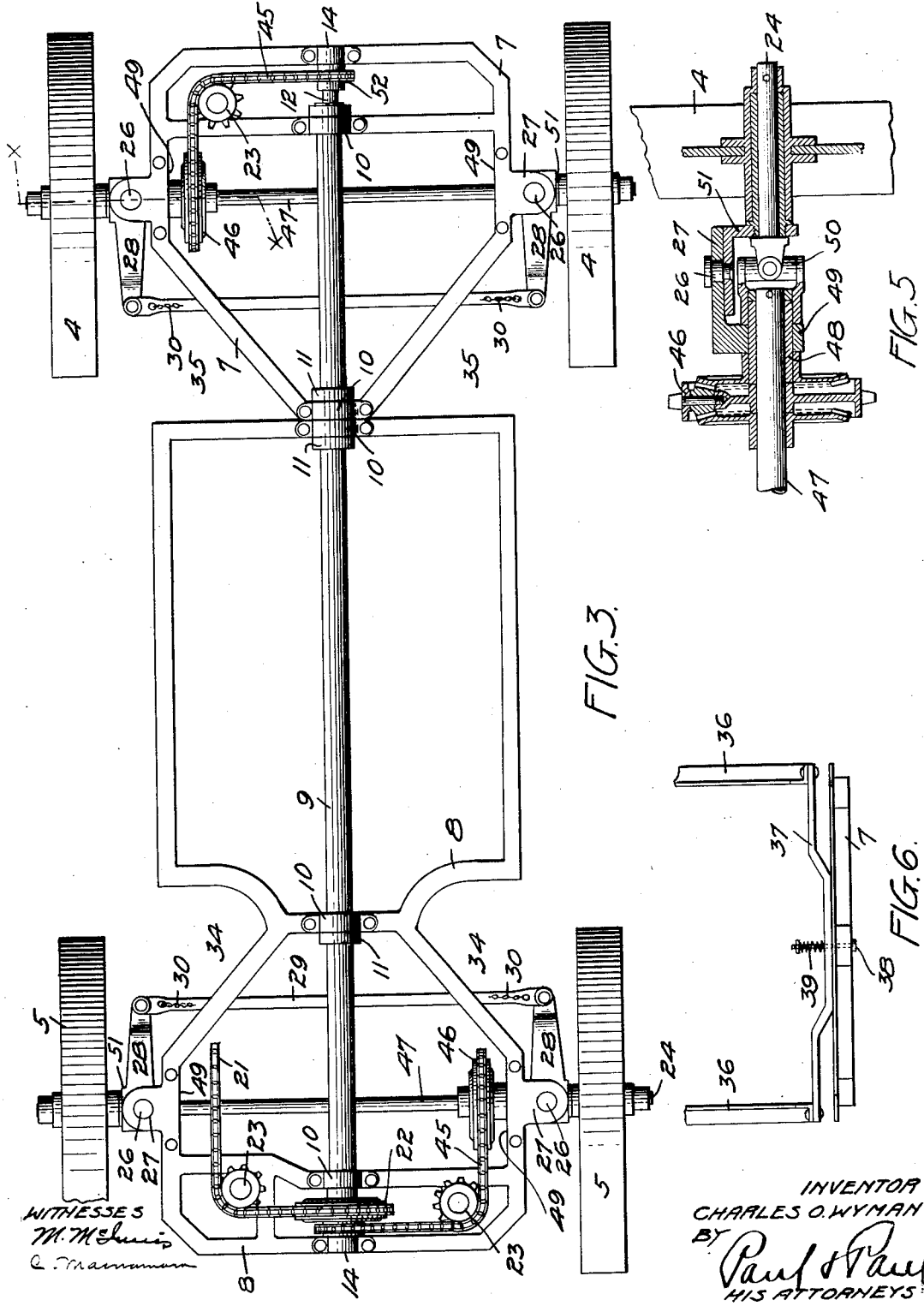
INVENTOR
CHARLES O. WYMAN
BY
Paul & Paul
HIS ATTORNEYS

UNITED STATES PATENT OFFICE.

CHARLES O. WYMAN, OF ANOKA, MINNESOTA.

RUNNING-GEAR.

938,196.  Specification of Letters Patent.  Patented Oct. 26, 1909.

Application filed January 22, 1906. Serial No. 297,095.

*To all whom it may concern:*

Be it known that I, CHARLES O. WYMAN, of Anoka, Anoka county, Minnesota, have invented certain new and useful Improvements in Running-Gears, of which the following is a specification.

My invention relates, generally, to running gears adapted for carriages, wagons, automobiles, and other vehicles, and the object of my invention is to provide a running gear wherein the driving power is applied to both the forward and rear axles.

A further object is to provide means whereby both the forward and rear wheels may be oscillated for steering purposes.

A further object is to provide improved driving connections between the source of power and the wheel axles.

A further and particular object is to provide improved means for bracing or strengthening the frame of the running gear to increase the rigidity of the same and render it capable of carrying a heavy load.

A further object is to provide means whereby the power supported on the frame of the running gear may be utilized for operating agricultural or milling machinery.

Other objects of the invention will appear from the following detailed description.

The invention consists, generally, in various constructions and combination, all as hereinafter described and particularly pointed out in the claims.

In the accompanying drawings forming part of this specification, Figure 1 is a plan view of a running gear for a carriage, wagon, traction engine, or automobile. Fig. 2 is a longitudinal vertical sectional view of the same. Fig. 3 is a plan view of a modified construction. Fig. 4 is a detail plan view showing the manner of connecting the steering apparatus of the forward wheels with the corresponding apparatus of the rear wheels. Fig. 5 is a sectional view on the line x—x of Fig. 3. Fig. 6 is an end view showing the manner of connecting the truss frame with the forward end of the running gear frame.

In the drawing 2 and 3 represent the forward and rear axles respectively, having carrying wheels 4 and 5 divided preferably into two parts or sections connected by compensating gears 6.

7 and 8 represent the forward and rear sections of a carrying frame. 9 is a hollow reach having bearings in boxes 10 on said frame section, and provided with collars 11 at its forward and rear ends to prevent longitudinal movement of the reach in its bearings. The frame sections are allowed to oscillate vertically on the hollow reach and adapt themselves to the vertical movement of the wheels in passing over rough ground. The forward wheels and frame section may move vertically independently of the rear sections and wheels, and thus all danger of twisting or racking the frame of the gear will be avoided.

12 is a driving shaft arranged within the hollow reach and having beveled gears 13 at its forward and rear ends in engagement with the compensating gears 6. Suitable bearings 14 are provided on the frame sections for the forward and rear ends of the driving shaft. By means of this shaft power is transmitted from the rear to the forward axle, and through the axles to the four carrying wheels. Upon the frame of the machine, preferably near the middle thereof, I arrange engines 15, preferably of the gasolene type, and having their piston rods 16 connected with a compound crank shaft 17 mounted transversely on the frame section 18 and extending beyond the said frame on each side, and provided with fly wheels 18' and driving pulleys 19, to which, whenever preferred, any small piece of machinery, such as a grinding or threshing mill, elevating apparatus or saw may be connected which ordinarily is driven from a stationary engine, employed exclusively for that purpose. A sprocket wheel 20 is mounted on the crank shaft 17, and connected by a chain 21 with a compensating gear 22 mounted on the driving shaft 12, which is arranged substantially at right angles to the shaft 17. This chain is of a peculiar skeleton link construction shown and described in a certain application for Letters Patent of the United States, filed by me on the 16 day of October 1905, Serial No. 282,925, and described therein as particularly adapted for transmitting power from a driving shaft to a driven shaft arranged substantially at right angles to the driving shaft. A suitable sprocket wheel 23 is mounted on the frame 8 and with which the chain 21 engages in making the right angle turn to engage the compensating gear 22. Power is thus transmitted from the engine shaft to the driving shaft, and from thence to the forward and rear axles. I have shown two engines mounted on the frame 8, one on each side of the center, for the purpose of balancing the running gear, but only one engine may be employed if preferred. The forward and rear wheels are each provided with spindles 24 pivotally connected with the ends of the axle sections by a vertical pivot, and also mounted in brackets 25 which are connected by vertical pivots 26 with lugs 27 on the frame sections. These lugs are arranged over the axles, and the pivots 26 are coincident with the pivots connecting the spindles with the ends of the axles. Arms 28 are provided on each bracket, those in front projecting forwardly of the forward axle, and those at the rear preferably projecting rearwardly of the rear axle. The opposite arms are connected by rods 29. Chains 30 are attached to said rods, and the middle portions of said chains are wrapped around the ends of a longitudinally arranged shaft 31, which has bearings on the machine frame and is rotated by means of a steering post 32 having a gear connection 33 with the said shaft. The rear frame section 8 is cut in on each side in front of the axle forming recesses 34 to receive the rear wheels and allow them to be oscillated back and forth. The rear end of the forward frame 7 converges toward the bearing thereof on the hollow reach, so that triangular shaped recesses 35 are provided in front of the frame section 8 to allow oscillation of the forward wheels. When, therefore, the shaft 31 is rotated in its bearing both the forward and rear wheels will be oscillated to steer the vehicle.

In Fig. 2 I have shown the apparatus illustrated in Fig. 1 with the addition of a truss frame 36 secured at its rear end to the frame section 8 and mounted on a rocker 37 at its forward end, which has a pivotal connection through a king bolt 38 with the forward portion of the frame 7. A spring 39 mounted on the king bolt holds the rocker down on the frame with a yielding tension. The truss frame is preferably composed of angle bar iron, and braces 40 are arranged at intervals between the truss frame and the rear frame 8. As shown clearly in this Fig. 2, the engines for the purpose of placing the load as near the ground as possible, may be arranged on the platform 41 supported by hangers 42 beneath the frame 8. This is a preferable construction as it is desirable to have the engines as low as possible for the purpose of rendering the running gear more stable and less liable to topple over in running on rough ground.

In Fig. 4 I have shown a slight modification in the steering apparatus, which consists in providing arms 43 on the forward and rear spindle brackets connected by diagonally arranged rods 44, so that when one set of wheels is oscillated the movement of the wheel on one side will be transmitted to the opposite wheel of the other set on the other side. The method of imparting the movement to the brackets may be the same as heretofore described.

In Fig. 3 I have shown a modification in the manner of transmitting power from the engine to the wheels, which consists in extending the hollow reach and the driving shaft therein beyond the forward and rear axles, bearings such as those heretofore described being provided on the frame sections. The compensating gear, similar to the one shown in Fig. 1, is mounted on the rear end of the driving shaft, and connected by a chain 45 with a compensating gear 46 having one part secured to the rear axle 47 near one end, and the other part mounted on a sleeve 48, which has a bearing 49 on said axle, and a vertical pivotal connection 50 with the wheel spindle. The frame section 8 is mounted on the bearing 49, and has lugs similar to those described in reference to Fig. 1, whereon brackets 51 are pivoted, the pivots of said brackets being in line vertically with the pivots 50 of the wheel spindles. The forward end of the driving shaft is provided with a sprocket 52 connected by a chain similar to the one at the rear end with a compensating gear on the forward axle, idle wheels being mounted on the forward and rear frames at the point where the chain makes the right angle turn in passing from the driving shaft to the axles. The arms 28 of the wheel spindle brackets preferably extend in the rear of the forward axle and in front of the rear axle, the opposite arms being connected in the manner heretofore described with reference to Fig. 1 and oscillating in a similar way. The running gear shown in Fig. 3 will be equipped with suitable engines having the crank shaft connected with the driving shaft by means of the chains 21, as heretofore described.

I claim as my invention:

1. The combination with the forward and rear axles and carrying wheels therefor, of a frame mounted on said axles, a driving shaft geared to said axles, a crank shaft arranged transversely on said frame at right angles substantially to said driving shaft, a source of power connected with said crank shaft, and a chain composed of skeleton links connecting said crank shaft and said driving shaft, substantially as described.

2. The combination with the forward and rear axles and carrying wheels, of a frame mounted on said axles, a driving shaft geared to said axles, a crank shaft arranged transversely on said frame and connected with a source of power and with said driving shaft, said crank shaft projecting on each side beyond said frame and provided with fly wheels and driving pulleys, substantially as described.

3. The combination with the forward and rear axles and carrying wheels and spindles, of a frame composed of independent forward and rear sections, the spindles of said wheels having vertical pivotal connections with said axles and frames, means for oscillating said spindles, a truss frame secured at its rear end to said rear frame section and having a rocker and king bolt connection at its forward end with said forward frame section, substantially as described.

4. The combination with the forward and rear axles and carrying wheels, of forward and rear frame sections independently movable of one another, truss bars secured at their rear ends to said rear section and arched over the middle portion of said frame, a rocker bar secured to the forward ends of said truss bars and having a king bolt connection with said forward frame, and bracing straps connecting the arched portion of said truss bars with said rear frame, substantially as described.

5. The combination with an axle, of a compensating gear comprising side and a middle member, one of said side members being secured on said axle, the other member having a sleeve loosely journaled on said axle and projecting beyond the end of the same, the spindle of said wheel having a vertical pivot in said sleeve, a bracket supporting said spindle and having a pivot on said frame coincident with the pivot on said spindle on said sleeve, and a driving connection for said compensating gear, substantially as described.

6. In a vehicle running gear, a flexible frame comprising forward and rear sections, a reach journaled in said sections, angle plates pivoted on said sections and having depending ends, sleeves rigidly attached to said depending ends, carrying wheels mounted on said sleeves, forward and rear axles, spindles extending through said sleeves, means for oscillating said sleeves and plates to guide the machine, and a source of power mounted on said frame and operatively connected with all four of said carrying wheels, substantially as described.

In witness whereof, I have hereunto set my hand this 11th day of January 1906.

CHARLES O. WYMAN.

Witnesses:
 RICHARD PAUL,
 C. MACNAMARA.